W. GALLAGHER.
Plow.
No. 77,272.  Patented April 28, 1868.
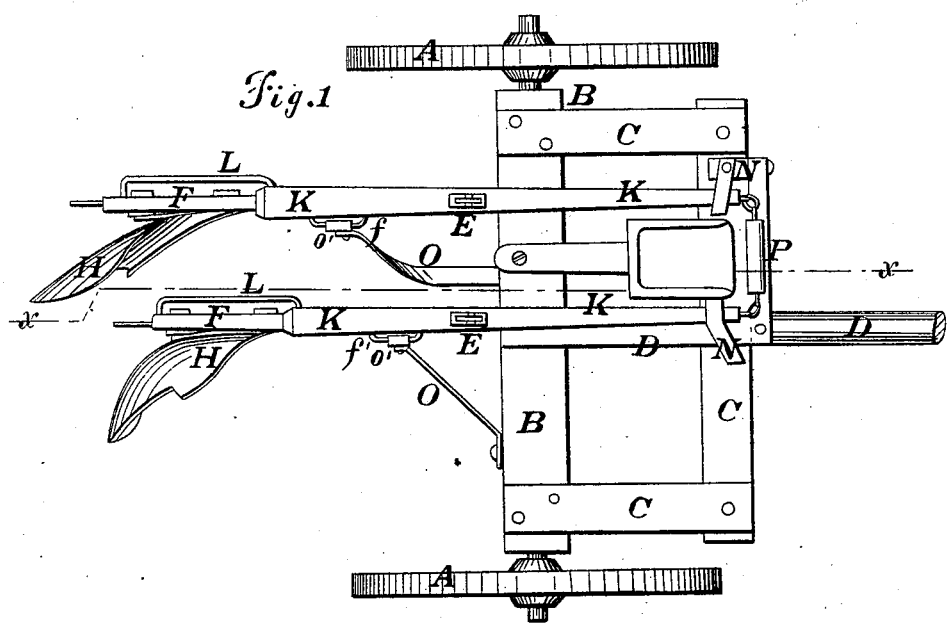
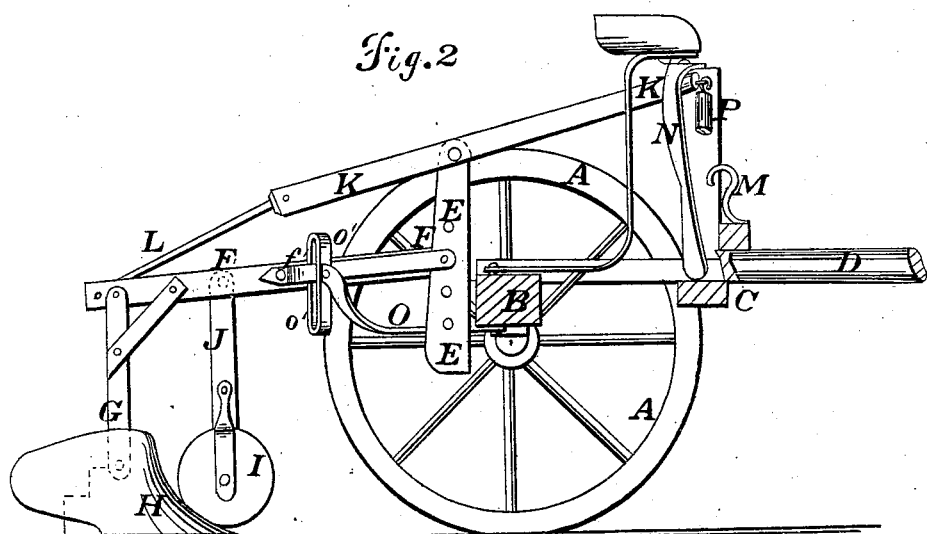

United States Patent Office.

WILLIAM GALLAGHER, OF SHULLSBURG, WISCONSIN.

Letters Patent No. 77,272, dated April 28, 1868.

IMPROVEMENT IN PLOUGHS.

*The Schedule referred to in these Letters Patent and making part of the same.*

TO ALL WHOM IT MAY CONCERN:

Be it known that I, WILLIAM GALLAGHER, of Shullsburg, in the county of Lafayette, and State of Wisconsin, have invented a new and useful Improvement in Ploughs; and I do hereby declare that the following is a full, clear, and exact description thereof, which will enable others skilled in the art to make and use the same, reference being had to the accompanying drawings, forming part of this specification.

Figure 1 is a plan or top view of my improved plough.

Figure 2 is a vertical section of the same, taken through the line $x\ x$, fig. 1.

Similar letters of reference indicate corresponding parts.

My invention has for its object to furnish an improved sulky-plough or ploughs, which shall be simple in construction, strong, and durable, and which will do more and better work with a less outlay of power than any of the ploughs now in common use; and it consists in the construction and combination of the various parts, as hereinafter more fully described.

A are the wheels. B is the axle, which should be so formed that one of the wheels may run in the furrow and the other upon the unploughed land, while keeping the machine in a horizontal position.

C is a rectangular frame, rigidly attached to the axle B, so as always to be in a horizontal position.

D is the tongue, which is attached to the axle B and frame C.

To the rear side of the axle B is securely attached one or more vertical bars or arms, E, as many being used as it is desired to have ploughs. The bars or plates E have numerous holes formed through them, to receive the bolt by which the forward ends of the plough-beams F are pivoted to them, so that the ploughs may be adjusted to run at a higher or lower level, according as it is desired, to plough shallower or deeper.

To the rear ends of the beams F are attached the upper ends of the standards G, to the lower ends of which the ploughs H are secured.

I are revolving cutters, pivoted to the lower ends of the standards J, the upper ends of which are attached to the plough-beams F, in such positions that the said revolving cutters may be in proper position to cut the sward in front of the plough-coulter.

K are levers, which are pivoted to the upper ends of the bars or arms E, and the rear ends of which are connected with the rear ends of the plough-beams F by connecting-rods or bars, L, as shown in the drawings.

The forward ends of the levers K extend forward, and are connected with each other by the bar P, so that the driver may depress the forward ends of the levers K, to raise the ploughs from the ground by bearing down with his feet upon the connecting-bar P.

M are catches, attached to the frame C in such positions as to take hold of the bar P, and hold the ploughs raised until the said bar is released from the said catches, allowing the ploughs to be again lowered.

The forward ends of the levers K are made to move up and down vertically, and thus raise and lower the ploughs vertically by means of vertical guide-bars, N, attached to the frame C, as shown in the drawings.

O are braces, the forward ends of which are securely and rigidly attached to the rear side of the axle B, and upon the rear ends of which are formed long vertical loops, $o'$, through which pass keepers, $f'$, attached to the sides of the plough-beams F, so as to securely brace the ploughs against side-pressure when at work, and at the same time allow the ploughs to be freely raised and lowered vertically.

I claim as new, and desire to secure by Letters Patent—

1. The combination of the vertical bar E with the axle B and forward end of the plough-beam F, substantially as herein shown and described, and for the purpose set forth.

2. The combination of the levers K with the plough-beams F and vertical arms or bars E, substantially as herein shown and described, and for the purpose set forth.

3. The combination of the braces O with the axle B and plough-beams F, substantially as herein shown and described, and for the purpose set forth.

WILLIAM GALLAGHER.

Witnesses:
P. B. SIMPSON,
JNO. H. SEALES.